United States Patent [19]
Hamilton

[11] Patent Number: 5,617,142
[45] Date of Patent: Apr. 1, 1997

[54] METHOD AND APPARATUS FOR CHANGING THE COMPRESSION LEVEL OF A COMPRESSED DIGITAL SIGNAL

[75] Inventor: Jeffrey S. Hamilton, Doylestown, Pa.

[73] Assignee: General Instrument Corporation of Delaware, Chicago, Ill.

[21] Appl. No.: 335,650

[22] Filed: Nov. 8, 1994

[51] Int. Cl.⁶ .................................................. H04N 11/02
[52] U.S. Cl. ........................ 348/405; 348/419; 348/406; 348/384
[58] Field of Search .................................. 348/455, 405, 348/404, 6, 416, 419; 455/72, 13.1

[56] References Cited

U.S. PATENT DOCUMENTS

| | | |
|---|---|---|
| 5,138,659 | 8/1992 | Kelkar et al. |
| 5,173,775 | 12/1992 | Walker. |
| 5,231,485 | 7/1993 | Israelsen et al. ........................... 348/6 |
| 5,345,594 | 9/1994 | Tsuda ..................................... 455/72 |
| 5,410,351 | 4/1995 | Kojima .................................. 348/405 |
| 5,412,484 | 5/1995 | Yoshikawa ............................. 348/405 |
| 5,424,777 | 6/1995 | Koga et al. ............................ 348/405 |
| 5,426,463 | 6/1995 | Reininger et al. ..................... 348/405 |
| 5,440,345 | 8/1995 | Shimoda ............................... 348/405 |
| 5,461,422 | 10/1995 | Hsieh ................................... 348/405 |
| 5,493,456 | 2/1996 | Augenbraun et al. ................. 360/64 |
| 5,519,503 | 5/1996 | Ohki .................................... 358/335 |

OTHER PUBLICATIONS

"Reduction of the bit-rate of compressed video while in its coded form" by Morrison, Nilsson, & Ghanbari, Sixth International Workshop of Packet Video, Portland, Oregon, USA. pp. 1–5. Sep. 27, 1994.

*Primary Examiner*—Tommy P. Chin
*Attorney, Agent, or Firm*—Barry R. Lipsitz; Ralph F. Hoppin

[57] ABSTRACT

A method and apparatus are provided for changing the compression level of digital information, such as digital video information. After having been compressed by a first compression scheme that provides quantized transform coefficients, the digital information is partially decompressed to recover the transform coefficients as they were prior to quantizing. The transform coefficients are then requantized at a different compression level. Complexity and expense are reduced by only partially decompressing and requantizing the previously compressed information to modify its compression level without the need to provide components such as a motion compensation processor and frame store that would be required for full decompression of the information prior to recompression.

26 Claims, 3 Drawing Sheets

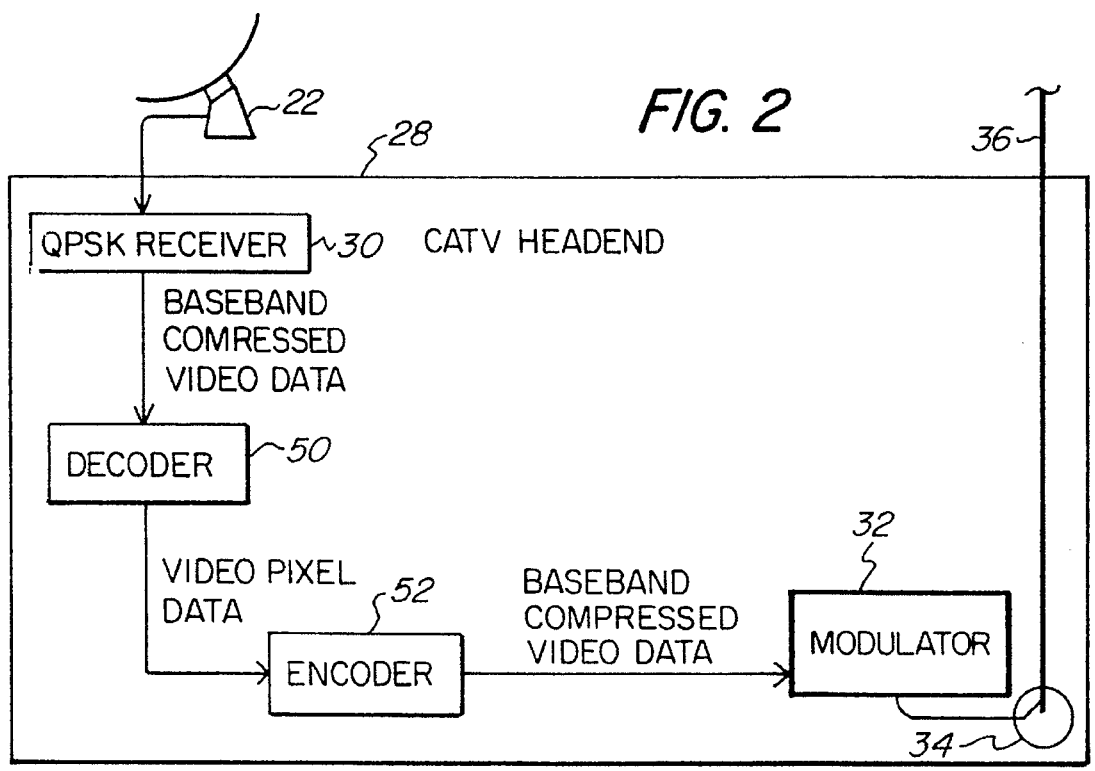
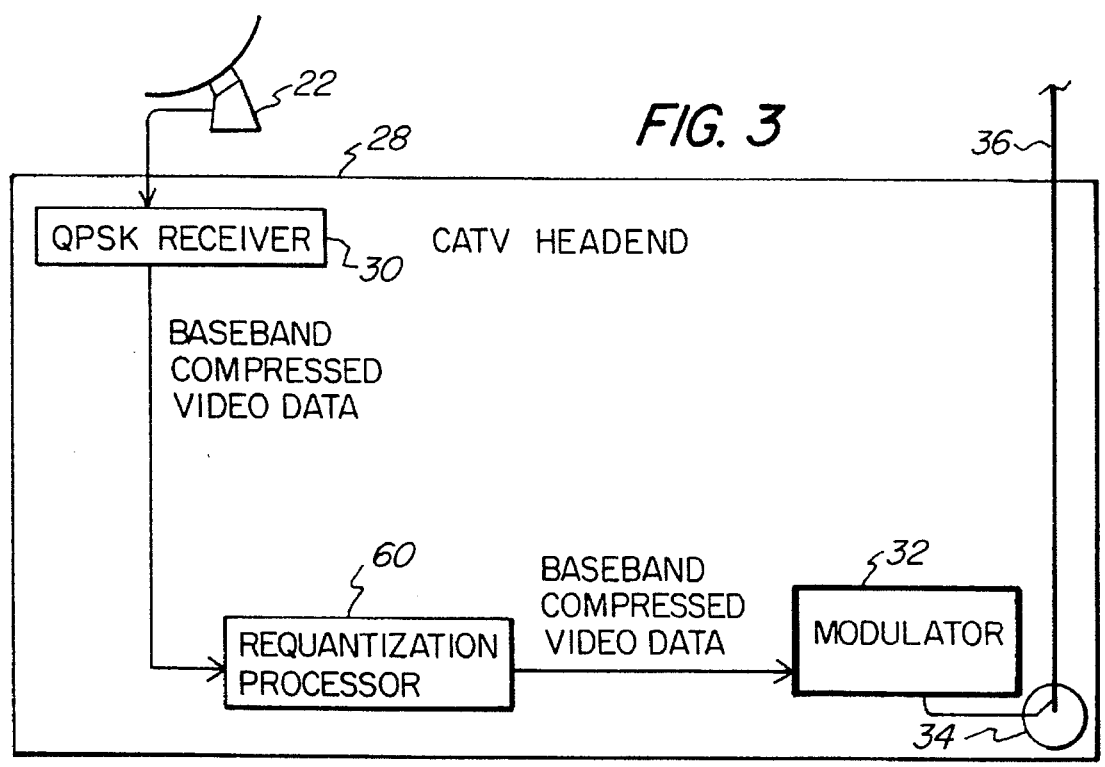

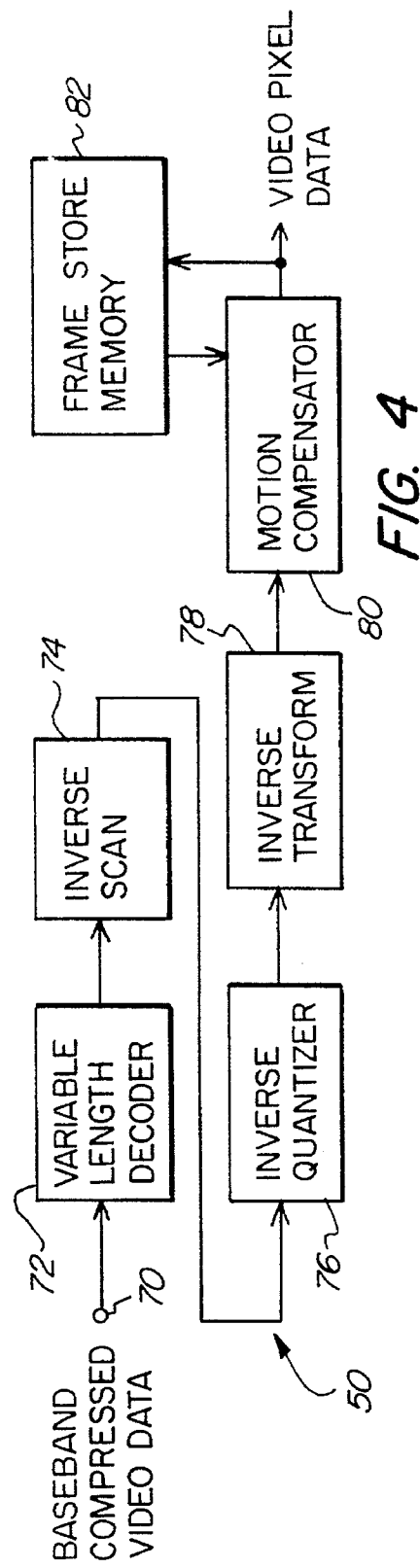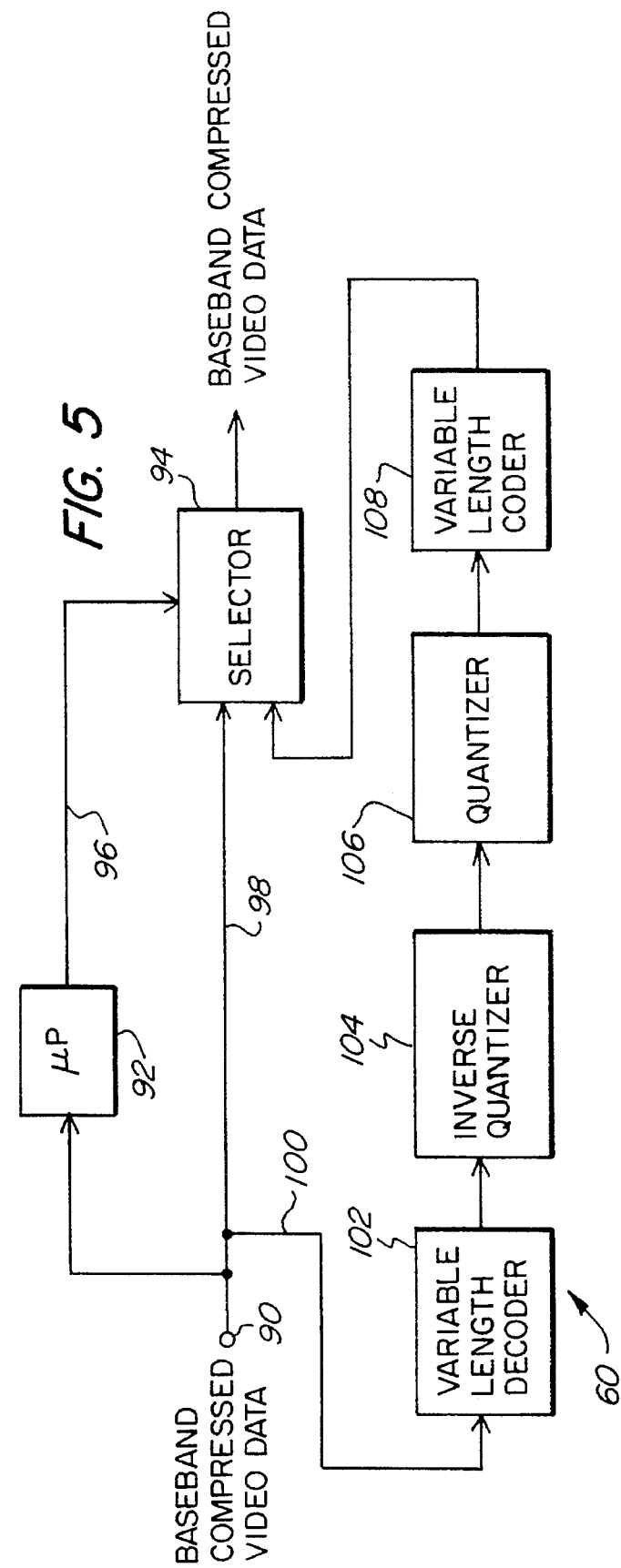

METHOD AND APPARATUS FOR CHANGING THE COMPRESSION LEVEL OF A COMPRESSED DIGITAL SIGNAL

BACKGROUND OF THE INVENTION

The present invention relates to the communication of compressed digital signals and more particularly to the distribution of compressed cable television signals or the like within an available bandwidth.

In cable television networks, subscribers are connected to a transmission stream carrying, e.g., television programs, radio programs and associated data which originates at a headend. To generate the transmission stream, the headend receives signals from a variety of sources including, for example, broadcast stations, data sources and premium channels via satellite. The signals are combined at the headend for retransmission to subscribers over the CATV network.

Digital transmission of television signals can deliver video and audio services of much higher quality than analog techniques. Digital transmission schemes are particularly advantageous for signals that are broadcast over cable television networks or by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television (HDTV) is provided. In a digital television system, a subscriber typically receives the digital data stream via a receiver/descrambler that provides video, audio and data to the subscriber. In order to most efficiently use the available radio frequency spectrum, it is advantageous to compress the digital television signals to minimize the amount of data that must transmitted.

The video portion of a television signal comprises a sequence of video images (typically "frames") that together provide a moving picture. In digital television systems, each line of a video frame is defined by a sequence of digital data bits referred to as "pixels." A large amount of data is required to define each video frame of a television signal. For example, 7.4 megabits of data is required to provide one video frame at NTSC (National Television System Committee) resolution. This assumes a 640 pixel by 480 line display is used with 8 bits of intensity value for each of the primary colors red, green and blue. High definition television requires substantially more data to provide each video frame. In order to manage this amount of data, particularly for HDTV applications, the data must be compressed.

Video compression techniques that enable the efficient transmission of digital video signals over conventional communication channels are well known. Examples can be found, for example, in Krause, et al. U.S. Pat. Nos. 5,057,916; 5,068,724; 5,091,782; and 5,093,720. Such techniques use compression algorithms that take advantage of the correlation among adjacent pixels in order to derive a more efficient representation of the most important information in a video signal. The most powerful compression systems not only take advantage of spacial correlation, but can also utilize similarities among adjacent frames to further compact the data.

Motion compensation is one of the most effective tools for accounting for and reducing the amount of temporal redundancy in sequential video frames. One of the most-effective ways to apply motion compensation in video compression applications is by differential encoding. In this case, the differences between two consecutive images (e.g., "frames") are attributed to simple movements. The encoder estimates or quantifies these movements by observing the two frames and sends the results to a decoder. The decoder uses the received information to transform the first frame, which is known, in a way that it can used to effectively predict the appearance of the second frame, which is unknown. The encoder reproduces the same prediction frame as the decoder, and then sends just the difference between the prediction frame and the actual frame. In this way, the amount of information needed to represent the image sequence can be significantly reduced, particularly when the motion estimation model closely resembles the frame to frame changes that actually occur. This technique can result in a significant reduction in the amount of data that needs to be transmitted once simple coding algorithms are applied to the prediction error signal.

In order to further compress the digital data, the prediction error signal can be transform coded. In transform coding, the video signal is subjected to an invertible transform, then quantized and variable length encoded. The purpose of the transformation is to convert statistically dependent picture elements into a set of statistically independent coefficients. In practice, one of the separable fast transforms in the class of unitary transforms is used, for example, cosine, Fourier or Hadamard. The most commonly used transform is the discrete cosine transform (DCT). The DCT is used in the MPEG and the DigiCipher® digital television standards.

In existing CATV distribution networks, television signals are transmitted over satellite for continental distribution and then retransmitted from different ground-based cites over cable or by terrestrial broadcasts for local distribution. Very high quality is typically maintained at a relatively high cost per receiver in the satellite link. This provides those applications that require high quality with a signal level they need. For the local distribution links to individual homes, cost generally has higher priority than signal quality. In order to reduce distribution costs, picture quality may be allowed to be degraded by ghosts, interference, cross modulation and the like. For those few sites that require higher quality signals, such as local broadcast center to CATV headends, the downlinked signals can be delivered via alternate means, such as dedicated fiber optic links, to maintain the high quality necessary.

For distribution of digital video signals, the transmission quality above a certain threshold has little effect on picture quality. As noted above, DCT based compression algorithms are commonly employed in the encoding of digital video signals. The extent of the compression will affect video picture quality. Therefore, the highest quality links available use very low loss or even lossless compression with high relative data rates and therefore a high link cost. Lower cost links can be provided by using compression with higher loss, resulting in lower data rates. As the loss resulting from higher compression increases, the data rate, distribution cost and picture quality will decrease.

It would be advantageous to provide a scheme that provides a high quality signal with relatively low loss compression over the primarily satellite link, with a lower quality, more highly compressed signal that can be distributed at lower cost for local distribution purposes. It would be further advantageous to provide such a scheme that requires only a minimal amount of compression related components at the redistribution sites which receive the high quality satellite signals and redistribute them locally at a higher compression level.

The present invention provides an apparatus and method that achieves the aforementioned and other advantages by only partially decompressing a received satellite signal and then recompressing the signal at a higher compression level for distribution at a lower data rate.

SUMMARY OF THE INVENTION

In accordance with the present invention, a method is provided for further compressing digital information which has already been compressed by a first compression scheme. The first compression scheme is a type which includes a transformation step for providing transform coefficients followed by a quantization step for quantizing the transform coefficients to a first resolution. In the method of the present invention, the already compressed digital information is partially decompressed to recover the transform coefficients as they were prior to quantizing at the first resolution. The recovered coefficients are then requantized to a lower coefficient resolution than the first resolution. The requantized transform coefficients are used to provide the digital information at a higher compression level than provided by the first compression scheme.

In an illustrated embodiment, the digital information comprises video information and the first compression scheme uses motion estimation to precompress the video information prior to the transformation and quantization steps. The step of partially decompressing the already compressed digital video information preserves the precompressed information without attempting to decompress it.

The first compression scheme can variably length encode the quantized transform coefficients at the first resolution. In this instance, the step of partially decompressing the already compressed digital information variable length decodes the encoded quantized coefficients and inverse quantizes the results to recover the transform coefficients as they were prior to quantizing. The step of using the requantized transform coefficients to provide the digital information at a higher compression level variable length encodes the requantized transform coefficients.

The method of the invention can comprise the further step of adjusting the coefficient resolution provided by the requantizing step to provide a compression level necessary for an intended application. In a further refinement, the coefficient resolution is dynamically adjustable in response to real time requirements of the intended application. The intended application can comprise, for example, the synchronization of a plurality of fixed rate compressed digital information streams by further compressing at least one of the streams to reduce its effective data rate. The intended application could alternatively comprise the adjustment of the data rates of digital information data streams provided in a statistically multiplexed form to maintain the streams within an available bandwidth.

The intended application could also comprise the adjustment of the amount of data provided in a digital information stream to enable the storage of the information within an available storage space. For example, real time recompression can be achieved for data that is to be stored on magnetic media such as the hard drive of a computer.

The method of the present invention also contemplates the selection of limited portions of the already compressed digital information for processing to provide only those portions at the higher compression level. Other portions of the already compressed digital information remain at the compression level provided by the first compression scheme. The recompression of only selected portions of the already compressed digital information is useful, for example, where the digital information comprises video information and the selected portions are limited to information that is not used to predict past or future video frames. Thus, for example, in an MPEG or DigiCipher® compressed digital video data stream, bidirectionally interpolated frames (B-frames) can be recompressed at a higher compression level while the anchor frames (I-frames and P-frames) remain at the lower compression level provided by the first compression scheme.

Apparatus is provided in accordance with the present invention for compressing a received digital signal that has already been compressed by a first compression scheme, to a new compression level. The first compression scheme will have provided transform coefficients and then quantized the transform coefficients to provide quantized coefficients at a first resolution. The apparatus includes an inverse quantizer for recovering the transform coefficients from quantized coefficients provided by the received digital signal. A quantizer is coupled to receive the recovered transform coefficients, without further decompression thereof, for requantization at a second resolution that is different from the first resolution.

The quantized coefficients can be variable length encoded by the first compression scheme, in which case the apparatus will comprise means prior to the inverse quantizer for variable length decoding the quantized coefficients. In such an embodiment, means are provided for variable length encoding the requantized transform coefficients from the quantizer.

The apparatus can further comprise means for selecting portions of the received signal for processing by the inverse quantizer and the quantizer to provide just those portions at the new compression level. Other portions of the received signal will remain at the compression level provided by the first compression scheme. For example, where the digital information comprises video information, the selected portions can be limited to information that is not used to predict past or future video frames.

Cable television distribution apparatus is provided in which a satellite downlink receives a first digital signal that has been compressed by a first compression scheme. The first compression scheme will have provided transform coefficients which were quantized at a first resolution. An inverse quantizer recovers the transform coefficients from quantized coefficients provided by the received digital signal. A quantizer is coupled to receive the recovered transform coefficients, without further decompression thereof, for requantization at a second resolution that is different from the first resolution. Means are provided for distributing a second digital signal formed from the requantized transform coefficients to a plurality of subscribers instead of distributing the first digital signal to the subscribers.

In the cable distribution apparatus of the present invention, the second resolution can be lower than the first resolution to render the bandwidth of the second digital signal smaller than the bandwidth of the first digital signal.

BRIEF DESCRIPTION OF THE DRAWINGS

FIG. 2 is a block diagram of a CATV headend that can be substituted for the headend illustrated in FIG. 1, in which received signals are completely decoded to recover the original video pixel data and then reencoded for distribution over a CATV network;

FIG. 3 is a block diagram of a CATV headend in accordance with the present invention wherein received compressed video data is only partially decompressed and then requantized to provide signals for distribution at a different compression level;

FIG. 4 is a block diagram of the decoder 50 illustrated in FIG. 2; and

FIG. 5 is a block diagram of the requantization processor 60 illustrated in FIG. 3.

DETAILED DESCRIPTION OF THE INVENTION

Figure 1:
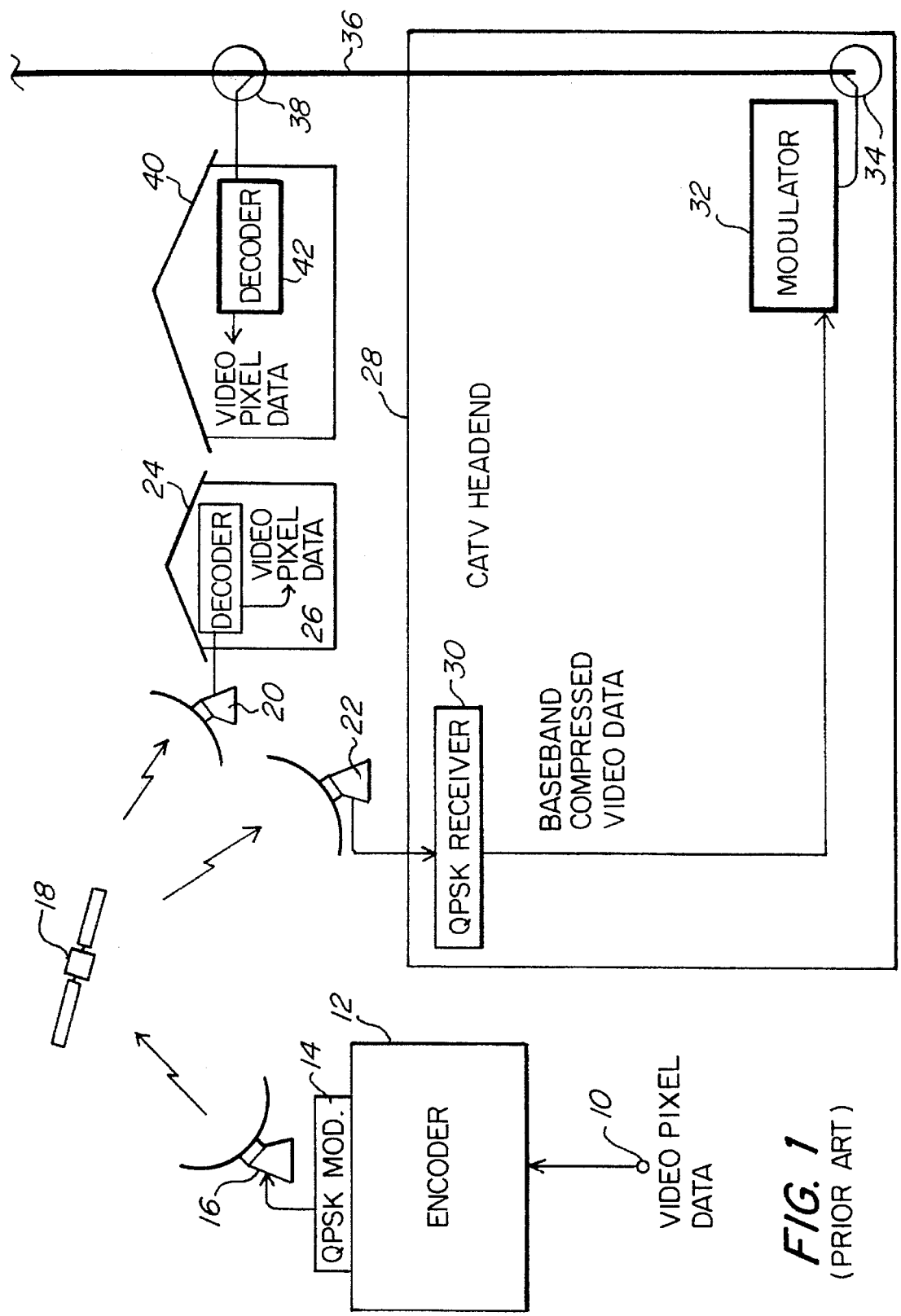
FIG. 1 is a block diagram of a prior art scheme in which digital television signals received by a CATV headend via satellite are distributed at the same compression level used for the satellite link.

The present invention provides a method and apparatus for partially decompressing a compressed digital information stream and then recompressing this stream at a different compression level to satisfy the needs of a desired application.

FIG. 1 illustrates a prior art system in which a tradeoff of data rate versus quality level is made at the satellite uplink for a complete signal distribution system. In particular, FIG. 1 illustrates a digital television signal distribution system in which signals are distributed both by satellite and by a cable network. Video pixel data to be communicated to a television receiver is input via terminal 10 to an encoder 12 at a satellite uplink. The video pixel data is compressed to a first compression level by encoder 12 in a conventional manner well known in the art. The compressed digital video data is then modulated, e.g., by a conventional quadrature phase shift keyed (QPSK) modulator 14 and transmitted to a communications satellite 18 via dish 16. The signals are relayed by the satellite to a plurality of dishes in various locations, such as dishes 20 and 22. Dish 20 serves a single home 24, which uses a conventional decoder 26 to reconstruct the original video pixel data.

Satellite dish 22 provides the digital video signals from satellite 18 to a CATV headend 28. Headend 28 includes a QPSK receiver 30 that converts the compressed digital video data to baseband for remodulation by a conventional modulator 32 (e.g., a QAM modulator). The modulated signal is then coupled to a cable television distribution path 36 via a coupler 34. At a subscriber location, a coupler 38 is used to provide a drop to an individual household 40, where a decoder 42 recovers the original video pixel data from the compressed data stream.

The prior art embodiment of FIG. 1 requires compromises that extend over the entire system. If very high quality, high data rate signals are provided, the initial satellite link may be well served but the secondary links (e.g., the CATV distribution network) may not be able to afford to further distribute the signal due to the high data rate and channel cost required by the high quality signals. The advantages of such high quality signals may provide little or no value for the cable television market. In addition, the cable television distribution path may not have the bandwidth necessary to support the high quality signals.

FIG. 2 illustrates a CATV headend that can replace the headend of FIG. 1. In the embodiment of FIG. 2, independent compression is provided on the satellite link and the cable distribution link. This is accomplished by fully decompressing the information received via the satellite link at the headend and then fully recompressing it for use by the cable distribution path with whatever tradeoffs are appropriate for that path. In particular, the baseband compressed video data recovered by QPSK receiver 30 is fully decoded by a decoder 50 to recover the video pixel data input at terminal 10 of the satellite uplink. The video pixel data is then reencoded by an encoder 52 at whatever compression level is desired to provide new baseband compressed video data for modulation by modulator 32. Distribution of the modulated signal is the same as described in connection with FIG. 1.

A block diagram of decoder 50 is illustrated in FIG. 4. The baseband compressed video data from QPSK receiver 30 is input via terminal 70 to a variable length decoder 72. Such decoders are well known. For example, the compressed data can be transmitted over the satellite link in the form of well known Huffman code words in which case variable length decoder 72 will comprise a conventional Huffman decoder. The decoded code words from variable length decoder 72 are inverse scanned by an inverse scan circuit 74 to place them back into the order they were in after quantizing at the encoder 12 (FIG. 1). Reordering of quantized transform coefficients is helpful in enhancing runlength coding efficiency, thereby improving compression, as well known in the art.

An inverse quantizer 76 provides the inverse of a quantization function that was applied at the encoder 12. The quantizing step at the encoder provides a degree of compression to the transform coefficients which are produced at the encoder to represent the video pixel data. After inverse quantization, the inverse of the encoder's transformation function is applied by an inverse transform processor 78. The resultant transform coefficients (e.g., DCT coefficients) are input to a motion compensator 80 in order to reconstruct successive video frames from the received prediction error signals. In order for the motion compensator 80 to reconstruct successive video frames, it is necessary for prior frames to be stored in a frame store memory 82 in a conventional manner. The video frames are output from the decoder 50 in the form of the reconstructed video pixel data.

The approach provided by the embodiment of FIG. 2 optimizes the tradeoff of quality versus data rate for both the satellite and CATV links at the cost of much more complex and expensive equipment at the retransmission site (i.e., headend). In particular, the cost of digital video compression processors is high and maintenance of the decoder 50 and encoder 52 will be required.

The present invention, as illustrated in FIG. 3, enables the compressed video data rate for secondary links such as a CATV network to be reduced without the expense and complexity of full decompression and recompression of the video signal received via satellite. In particular, the embodiment of FIG. 3 does not require the CATV headend to have complex and expensive equipment, such as the motion compensator 80 and frame store memory 82 of decoder 50. Instead, the novel headend of FIG. 3 merely requires a requantization processor 60 that requantizes the received compressed information without having to completely decompress it.

The relatively simple coefficient quantization processor is where the picture quality versus data rate tradeoff occurs. Indeed, this is the only place in an MPEG or DigiCipher® compression scheme in which picture quality is lost. By taking a compressed video data stream through the decoding process only to the inverse quantization stage and then requantizing it to a different coefficient resolution, the compressed data rate can be easily and inexpensively adjusted.

As illustrated in FIG. 3, the baseband compressed video data provided by QPSK receiver 30 is input to a requantization processor 60. The requantization processor is shown in greater detail in the block diagram of FIG. 5. The baseband compressed video data is input via terminal 90 to a selector 94 that either outputs the baseband data in its current form via path 98 or the data from a requantization path 100. For example, when the received data has been encoded with I, P and B frames, requantization can be selectively performed on all B frames and a limited number of P frames preceding each I frame. This number will depend on the extent of rate reduction and keeps the prediction error propagation chain constrained. Alternatively, the requantization can be provided for B frames only, allowing a limited rate reduction without any divergence between the final decoder's stored anchor frames and those expected by the encoder.

Selector 94 is responsive to signals received from a microprocessor 92 via path 96 to select either the requantized or the originally compressed signals for output. Microprocessor 92 receives, via terminal 90, data contained in a header for each frame indicating whether the frame is a B frame, an I frame, a P frame preceding an I frame or a P frame that does not precede an I frame. Based on this information, the microprocessor will decide whether to actuate selector 94 to output the baseband compressed video data directly from terminal 90 via path 98 or after requantization via path 100.

In order to accomplish requantization, a variable length decoder 102 is provided. The decoded variable length code words from decoder 102 are inverse quantized in an inverse quantize processor 104 to recover the transform coefficients as they were at the encoder 12 prior to quantizing at a first resolution. A quantizer 106 then requantizes the recovered transform coefficients at a different (e.g., lower) resolution than the first resolution. The requantized coefficients are input to a variable length coder 108 and output via selector 94 for modulation by modulator 32 (FIG. 3) and subsequent distribution over cable 36.

In comparing the requantization processor 60 of FIG. 5 to the decoder 50 of FIG. 4, it can be seen that the requantization processor eliminates the need for motion compensator 80, frame store memory 82, inverse transform processor 78, and inverse scan converter 74. Comparable components of encoder 52 required in the embodiment of FIG. 2 are also eliminated in the FIG. 3 embodiment. The inverse scan stage is not required in the requantization processor 60 because the order in which the quantized coefficients is received will be the same order in which they are output, and there is no need to reorder the coefficients for use by a motion compensator.

Although the embodiment illustrated in FIG. 3 provides requantized data for use in a cable television distribution path, there are many other applications in which the present invention can be used. For example, when synchronizing fixed rate multiplexed time bases where the mismatch of different signals in the multiplex may be very slight, the present invention can be used to slightly adjust the data rates of different signals by requantization to provide proper synchronization.

Requantization can also be used with compressed digital video programs that are received in a statistically multiplexed form in order to reduce the data rate of a given program during those times when it exceeds either a fixed rate or variable rate retransmission. Still further, requantization can be used to statistically multiplex a group of programs for retransmission by controlling the revised quantization level of each video component to minimize the added coding loss while filling the available multiplex rate.

The present invention also applies to still frame compression, such as JPEG compression. In still frame applications where motion compensation is not generally used, requantization in accordance with the present invention can be used to reduce the data rate or the compressed frame size without the need for inverse scan, IDCT, DCT and block scan processing stages.

The invention also is applicable to storage applications such as storing compressed video data on magnetic media. In this case, requantization can reduce the quantity of data rather than the data rate.

It should now be appreciated that the present invention provides a method and apparatus for further compressing digital information which has already been compressed by a first compression scheme. The already compressed data is only partially decompressed to a point at which the transform coefficients are recovered. The recovered transform coefficients are then requantized to a different coefficient resolution than provided by the first compression scheme. The requantized transform coefficients provide the digital information at a different compression level than provided by the first compression scheme.

Although the invention has been described in connection with various illustrated embodiments, those skilled in the art will appreciate that numerous adaptations and modifications may be made thereto without departing from the spirit and scope of the invention as set forth in the claims.

What is claimed is:

1. A method for recompressing digital information at a first compression level to a second compression level, wherein said digital information at said first compression level has already been compressed by a compression scheme that included a transformation step for providing transform coefficients followed by a quantization step for quantizing said transform coefficients to provide quantized transform coefficients at a first resolution, said method comprising the steps of:

inverse quantizing said already compressed digital information to recover the transform coefficients;

requantizing the recovered transform coefficients at a second resolution, said first resolution being different than said second resolution; and using the requantized transform coefficients to provide said digital information at said second compression level;

wherein said second compression level is different than said first compression level.

2. A method in accordance with claim 1 wherein:

said digital information comprises video information;

said compression scheme uses motion estimation to precompress said video information prior to said transformation and quantization steps; and said step of inverse quantizing the already compressed digital video information preserves the precompressed information without attempting to decompress it.

3. A method in accordance with claim 2 wherein said compression scheme variable length encodes the quantized transform coefficients at said first resolution, said method comprising the further step of:

variable length decoding the encoded quantized transform coefficients to obtain decoded quantized transform coefficients prior to said inverse quantizing step; wherein said step of using the requantized transform coefficients to provide said digital information at said second compression level includes variable length encoding of the requantized transform coefficients.

4. A method in accordance with claim 1 wherein said compression scheme variable length encodes the quantized transform coefficients at said first resolution, said method comprising the further step of:

variable length decoding the encoded quantized transform coefficients to obtain decoded quantized transform coefficients prior to said inverse quantizing step; wherein said step of using the requantized transform coefficients to provide said digital information at said second compression level includes variable length encoding of the requantized transform coefficients.

5. A method in accordance with claim 1 comprising the further step of:

adjusting said second resolution provided by said requantizing step to provide said second compression level as necessary for an intended application.

6. A method in accordance with claim 5 wherein said second resolution is dynamically adjustable in response to real time requirements of said intended application.

7. A method in accordance with claim 5 wherein said intended application comprises a synchronization of a plurality of fixed rate compressed digital information streams by further compressing at least one of said streams to reduce its effective data rate.

8. A method in accordance with claim 5 wherein said intended application comprises an adjustment of the data rates of digital information data streams provided in a statistically multiplexed form to maintain said streams within an available bandwidth.

9. A method in accordance with claim 5 wherein said intended application comprises an adjustment of an amount of data provided in said digital information at said second compression level to enable storage of said information within an available storage space.

10. A method in accordance with claim 1 wherein only selected portions of the already compressed digital information are processed to provide those portions at said second compression level, with other portions thereof remaining at said first compression level.

11. A method in accordance with claim 10 wherein:

said digital information comprises video information;

said second resolution is lower than said first resolution; and said selected portions are limited to information that is not used to predict past or future video frames.

12. Apparatus for transforming a received digital signal which is compressed at a first compression level to a second compression level, said received digital signal including transform coefficients which are quantized at a first resolution, said apparatus comprising:

an inverse quantizer for recovering said transform coefficients from said quantized transform coefficients provided by said received digital signal; and a quantizer coupled to receive the recovered transform coefficients without further decompression thereof for requantization at a second resolution that is different from said first resolution, said second resolution dictating said second compression level.

13. Apparatus in accordance with claim 12 wherein said quantized transform coefficients at said first resolution are variable length encoded, said apparatus further comprising:

means for variable length decoding the quantized transform coefficients prior to said recovering of said transform coefficients by said inverse quantizer; and means for variable length encoding the requantized transform coefficients from said quantizer.

14. Apparatus in accordance with claim 12 further comprising:

means for selecting portions of the received signal for processing by said inverse quantizer and said quantizer to provide those portions at said second compression level, with other portions of the received signal remaining at said first compression level.

15. Apparatus in accordance with claim 14 wherein:

said received digital signal comprises video information; and said selected portions are limited to information that is not used to predict past or future video frames.

16. Cable television distribution apparatus comprising:

a satellite downlink for receiving a first digital signal that has been compressed at a first compression level, said digital signal including transform coefficients which are quantized at a first resolution;

an inverse quantizer for recovering said transform coefficients from said quantized transform coefficients provided by said received first digital signal;

a quantizer coupled to receive the recovered transform coefficients without further decompression thereof for requantization at a second resolution that is different from said first resolution; and means for distributing a second digital signal formed from said requantized transform coefficients to a subscriber in place of said first received digital signal, said second digital signal being provided at a second compression level dictated by said second resolution.

17. Apparatus in accordance with claim 16 wherein said second resolution is lower than said first resolution to render the bandwidth of said second digital signal smaller than the bandwidth of said first digital signal.

18. Apparatus in accordance with claim 16 wherein said quantized transform coefficients are variable length encoded, said apparatus further comprising:

means for variable length decoding the quantized transform coefficients prior to said inverse quantizer; and means for variable length encoding the requantized transform coefficients from said quantizer.

19. Apparatus in accordance with claim 16 further comprising:

means for selecting portions of the received first digital signal for processing by said inverse quantizer and said quantizer to provide those portions at said second compression level, with other portions of the received signal remaining at said first compression level.

20. Apparatus in accordance with claim 19 wherein:

said received first digital signal comprises video information; and said selected portions are limited to information that is not used to predict past or future video frames.

21. A method in accordance with claim 1, wherein said requantized transform coefficients are quantized individually.

22. Apparatus in accordance with claim 12, wherein said requantized transform coefficients are quantized individually.

23. Apparatus in accordance with claim 16, wherein said requantized transform coefficients are quantized individually.

24. A method in accordance with claim 1, wherein said digital information at said first compression level is provided over an existing communication channel prior to said partial decompressing step.

25. Apparatus in accordance with claim 12, wherein said received digital signal is received from an existing communication channel.

26. Apparatus in accordance with claim 16, wherein said received first digital signal is received from an existing communication channel.

* * * * *